United States Patent
Roza

[15] 3,662,436
[45] May 16, 1972

[54] SCREW ANCHOR
[72] Inventor: Kenneth Ralph Roza, Chicago, Ill.
[73] Assignee: Joslyn Mfg. and Supply Co., Chicago, Ill.
[22] Filed: Dec. 28, 1970
[21] Appl. No.: 101,624

[52] U.S. Cl..............................24/115 B, 52/157, 287/108
[51] Int. Cl............................................................E02d 5/74
[58] Field of Search.................24/279, 115 B; 52/165, 157; 287/108

[56] References Cited

UNITED STATES PATENTS

| | | | |
|---|---|---|---|
| 505,811 | 10/1893 | Brown | 52/157 |
| 1,193,725 | 8/1916 | Smith | 52/157 |
| 2,085,074 | 6/1937 | Boyles | 287/108 |
| 2,864,633 | 12/1958 | Mackie | 52/157 X |
| 3,016,117 | 1/1962 | Petersen | 52/157 |
| 3,439,938 | 4/1969 | Dunton | 287/108 |

*Primary Examiner*—Donald A. Griffin
*Attorney*—Mason, Kolehmainen, Rathburn & Wyss

[57] ABSTRACT

A screw anchor used in securing a guy wire to the ground includes at least one helical cutting blade attached to a generally square-shaped shaft, one end of which is pointed to facilitate the insertion of the screw anchor into the ground. Located near the other end of the shaft is a generally circular cross-sectional groove which forms an installation hub out of the other end of the shaft, and which is designed so that the torsional ultimate strength of the shaft at the groove is less than the torsional yield strength of the full square-shaped shaft. Extension rods are connectable to the end portion of the shaft forming the installation hub for increasing the length of and securing the guy wire to the screw anchor.

6 Claims, 5 Drawing Figures

PATENTED MAY 16 1972
3,662,436
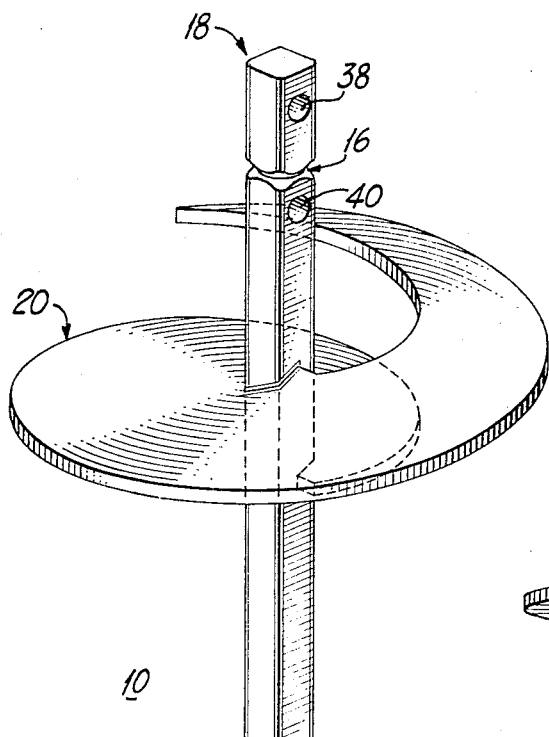
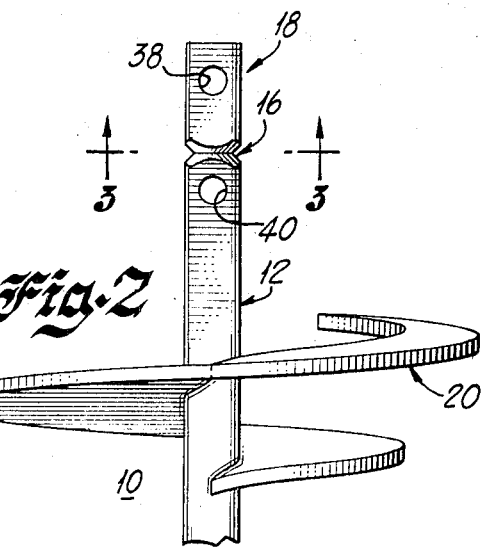
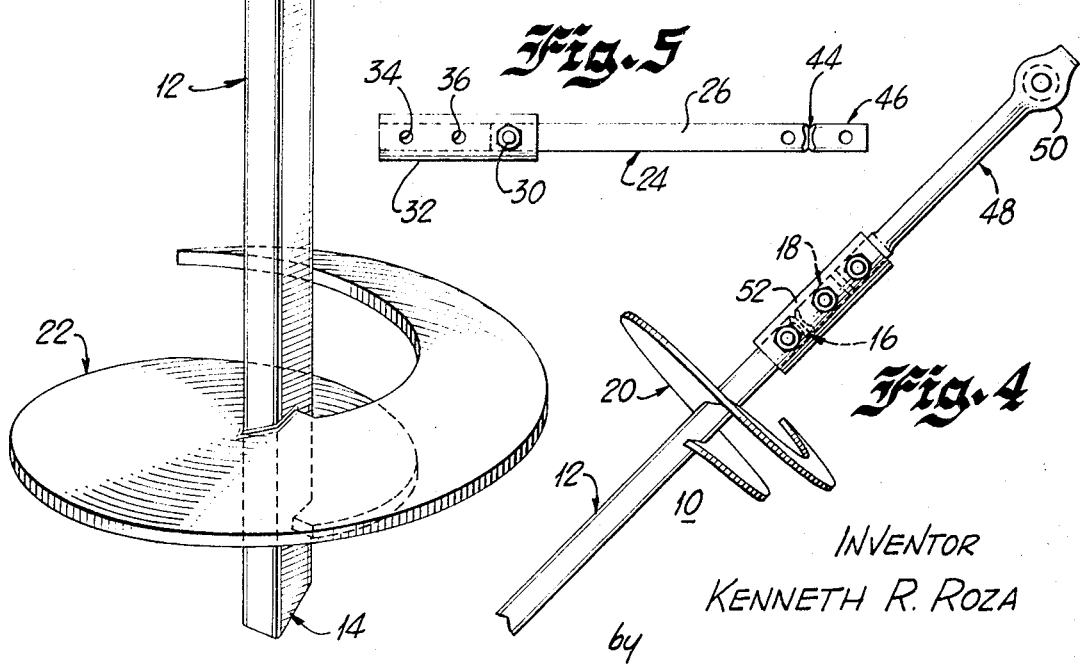
INVENTOR
KENNETH R. ROZA
by
Mason, Kolehmainen, Rathburn and Wyss
ATTORNEYS

SCREW ANCHOR

This invention relates to screw anchors and, more particularly, to a new and improved shaft structure for screw anchors.

Screw anchors are generally used to secure a guy wire and the like to the ground. Commercially available screw anchors include a solid, generally square-shaped shaft to which is affixed at least one cutting blade that enables the screw anchor to be inserted into the ground upon the application of an installing torque on the shaft of the screw anchor. One end of the shaft is pointed to facilitate the insertion of the screw anchor into the ground, and the other end is adapted to receive an extension rod so that the screw anchor can be increased to any desired length.

The installing torque exerted on the shaft of the screw anchor can either be manually applied, or be applied by a power actuated wrench. During the installation of the screw anchor, both the pointed end of the shaft and the cutting blade affixed to the shaft encounter or strike various obstructions. As the torque is increased on the shaft due to the occurrence of the obstructions, the shear stresses on the shaft and the cutting blade may be increased beyond the torsional yield strength of the square shaft. As a result, the screw anchor is rendered unusable as the shaft tends to be weakened or shear apart under the increased torque. Furthermore, the removing of any portion of the screw anchor already inserted into the ground can be quite difficult.

Accordingly, one object of the present invention is to provide a new and improved screw anchor.

Another object is to provide a new and improved shaft structure for a screw anchor to improve the usefulness of the screw anchor.

In accordance with these and many other objects, an embodiment of the present invention comprises a screw anchor for securing a guy wire or the like to the ground having a generally square-shaped shaft to which is affixed at least one cutting blade to enable insertion and retention of the screw anchor in the ground. One end of the shaft is pointed to facilitate the installation of the screw anchor into the ground and near the other end of the shaft is located a generally circular cross-sectional groove which forms an installation hub for the shaft. The groove is designed so that the torsional ultimate strength of the shaft at the groove is less than the torsional yield strength of the full square-shaped shaft. An extension rod is connectable to the installation hub for increasing the screw anchor to any desired length.

Many other objects and advantages of the present invention will become apparent from considering the following detailed description in conjunction with the drawings in which:

FIG. 1 is a perspective view of the screw anchor embodying the present invention;

FIG. 2 is a side elevational view of a portion of the screw anchor shown in FIG. 1;

FIG. 3 is a cross-sectional view of the shaft portion of the screw anchor shown in FIG. 2 taken along line 3—3;

FIG. 4 is a perspective view of a portion of the screw anchor shown in FIG. 1 with an extension rod attached thereto; and FIG. 5 is a perspective view of an extension rod connectable to the screw anchor shown in FIG. 1.

Referring now more specifically to FIG. 1 of the drawings, therein is illustrated a screw anchor which is indicated generally as 10 and which embodies the present invention. The screw anchor 10 includes a generally square-shaped shaft 12, one end of which is formed into a point 14 that facilitates the insertion of the screw anchor 10 into the ground. Located near the other end of the shaft 12 is a generally circular cross-sectional necked down portion or groove 16 which forms an installation hub 18 out of the other end of the shaft 12. The groove 16 is designed so that the torsional ultimate strength of the shaft 12 at the groove 16 is less than the torsional yield strength of the full square-shaped shaft 12 at any other position along the shaft 12.

A pair of cutting blades 20 and 22 are welded or forged to the shaft 12 between the groove 16 and the pointed end 14.

The generally helical shape of the cutting blades 20 and 22 enable the insertion of the screw anchor into the ground upon the exertion of an appropriate installing torque to the shaft 12 at the installation hub 18. The cutting blade 20 is positioned on the shaft 12 so that the blade 20 follows or tracks the helical path cut by the cutting blade 22 during the installation of the screw anchor 10 into the ground. By so locating the blade 20 on the shaft 12, a multi-helix screw anchor 10 is installable into the ground with substantially the same installation torque as is required for a screw anchor with only one cutting blade.

Many times during the advancement of the screw anchor 10 into the ground, the cutting blades 20 and 22 and the pointed end 14 encounter numerous obstructions, or an angular movement occurs between the blades 20 and 22 causing distortion of the tracking by the blade 20 of the path cut by the blade 22. In order to overcome such obstructions or distortions, the torque applied to the shaft 12 of the screw anchor 10 may be increased to a value greater than the torsional ultimate strength of the shaft 12 at the groove 16. As long as the installation torque is applied to the installation hub 18, the shaft 12 shears apart upon the extraordinary increase in the installation torque only at the groove 16 before the torque is increased to the torsional yield strength of the full square-shaped shaft 12.

If it were not for the groove 16 being located near the end portion of the shaft 12, the installation torque might be increased above the torsional yield strength of the full square shaft 12. The shaft 12 could shear apart or be substantially weakened anywhere along its length so that removal of any portion of the screw anchor 10 already in the ground could be quite difficult or the ultimate holding strength of the anchor 10 could be lessened. On the other hand, with the groove 16 located near one end of the shaft 12, the shearing occurs only at the preferred location near the end of the shaft 12 so that once the installation hub 18 is completely removed the screw anchor 10 can easily be removed from the ground or the installation of the screw anchor 10 can be continued without any decrease in the holding strength of the anchor 10.

Accordingly, the groove 16 acts as a fail-safe mechanism which, at failure, indicates that the torque being applied to the screw anchor 10 is approaching the torsional yield strength of the shaft 12, that the helical path for the blades 20 and 22 is being distorted, or that the optimum depth for the screw anchor 10 has been reached. Of course, once the installation hub 18 is removed after a failure at the groove 16, the screw anchor 10 can be further inserted into the ground by directly coupling an installing device to the full square-shaped shaft 12, but in so doing, the torsional yield strength of the shaft 12 may be exceeded.

Once the screw anchor 10 has been inserted into the ground to a point near the groove 16, an extension rod 24, shown in FIG. 5 can be attached to the end of the shaft 12 forming the installation hub 18. The extension rod 24 has a generally square-shaped shank portion 26 through one end of which is insertable a fastener 30 which secures a coupler 32 to the extension rod 24. The coupler 32 has a pair of holes 34 and 36 which correspond to a pair of holes 38 and 40 located on either side of groove 16 on the shaft 12. By inserting fasteners through the holes 34 and 36 and the holes 40 and 38, respectively, the coupler 32 secures the extension rod 24 to the shaft 12 and overlaps the groove 16. With the coupler 32 overlapping the groove 16, the shaft 12 has a uniform torsional yield strength along its entire length.

To protect the shaft 12 and the shank portion 26 from shearing apart anywhere along their lengths due to possible excessive installation torques, a generally circular cross-sectional groove 44 similar to the groove 16 is located near the other end of the shank portion 26 so that an installation hub 46 is formed out of the other end of the shank portion 26. Accordingly, as the insertion into the ground of the screw anchor 10 with the extension rod 24 attached to the shaft 12 is continued, any installation torque exerted on the installation hub 46 above the torsional ultimate strength of the shank portion 26 at the groove 44 causes the extension rod 24 to shear apart only at the groove 44.

Once the screw anchor 10 is inserted into the ground with as many extension rods 24 as desired attached thereto, an extension rod 48 having an eyelet 50, to which a guy wire can be connected, is secured to the appropriate installation hub 46, or as shown in FIG. 4, to the installation hub 18, by a coupler 52. The coupler 52 overlaps the groove 16 on the shaft 12 or, in the alternative, overlaps the groove 44 on the shank portion 26 of the extension rods 24. Thus, once the screw anchor 10 is inserted into the ground to the desired depth, the torsional yield strength of the screw anchor 10 is equivalent to the torsional yield strength of the full square-shaped shaft 12 or the shank portion 26 for the couplers 32 and 52 overlap any of the grooves 16 or 44 that are positioned along the shaft 12 or any of the shank portions 26.

Although the present invention has been described by reference to only a single embodiment thereof, it will be apparent that numerous other modifications and embodiments may be devised by those skilled in the art, and it is intended by the appended claims to cover all modifications and embodiments which will fall within the true spirit and scope of the present invention.

What is claimed as new and desired to be secured by Letters Patent of the United States is:

1. A screw anchor installable into the ground by the application of torsional forces so as to secure a guy wire or the like to the ground, said screw anchor comprising:

a shaft having a first necked down groove near one end to form an installation hub to which are applied said torsional forces, at least one cutting blade attached to said shaft at a point spaced from said first necked down groove, an extension rod having a second necked down groove near a first end portion, and a coupler means attachable to said extension rod at a second end portion and to said shaft at said installation hub, said coupler means overlapping said first necked down groove when attached to said shaft.

2. The screw anchor as set forth in claim 1 wherein the first necked down groove has a torsional ultimate strength less than the torsional yield strength of the shaft.

3. The screw anchor as set forth in claim 1 wherein said shaft is generally square-shaped.

4. The screw anchor as set forth in claim 1 wherein said first necked down groove has a generally round cross section.

5. The screw anchor as set forth in claim 1 wherein said cutting blade is welded to said shaft.

6. The screw anchor as set forth in claim 1 including first and second helical cutting blades attached to said shaft, said first cutting blade following the path cut by said second cutting blade.

* * * * *